(12) United States Patent
Lu

(10) Patent No.: US 8,059,419 B2  
(45) Date of Patent: Nov. 15, 2011

(54) CHIP CARD HOLDER

(75) Inventor: Chi-Chung Lu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 323 days.

(21) Appl. No.: 12/534,285

(22) Filed: Aug. 3, 2009

(65) Prior Publication Data

US 2010/0053917 A1 Mar. 4, 2010

(30) Foreign Application Priority Data

Aug. 28, 2008 (CN) .......................... 2008 1 0304279

(51) Int. Cl.  
*H05K 5/00* (2006.01)

(52) U.S. Cl. .......................... 361/759; 439/946; 439/326

(58) Field of Classification Search .................. 361/759, 361/737; 439/945, 946, 630, 326; 235/492  
See application file for complete search history.

(56) References Cited

U.S. PATENT DOCUMENTS

| | | | |
|---|---|---|---|
| 5,655,917 A * | 8/1997 | Kaneshige et al. ........... | 439/155 |
| 5,790,659 A * | 8/1998 | Strand ...................... | 379/433.09 |
| 6,193,557 B1 * | 2/2001 | Luvini et al. ................. | 439/630 |
| 6,343,945 B1 * | 2/2002 | Liikanen ....................... | 439/160 |
| 6,724,618 B1 * | 4/2004 | Jenkins et al. ........... | 361/679.32 |
| 6,831,977 B2 * | 12/2004 | Kiernan et al. .......... | 379/433.09 |
| 6,875,041 B1 * | 4/2005 | Chang et al. .................. | 439/347 |
| 6,888,724 B2 * | 5/2005 | Shaie ........................... | 361/719 |
| 6,969,282 B2 * | 11/2005 | Liu ............................... | 439/630 |
| 7,086,887 B2 * | 8/2006 | Tsai et al. .................... | 439/331 |
| 7,093,764 B1 * | 8/2006 | Valenzuela et al. .......... | 235/486 |
| 7,306,491 B1 * | 12/2007 | Wei et al. .................... | 439/630 |
| 7,354,290 B2 * | 4/2008 | Zhan et al. .................. | 439/326 |
| 7,445,510 B2 * | 11/2008 | Feng et al. .................. | 439/630 |
| 7,494,360 B2 * | 2/2009 | Zhan et al. .................. | 439/326 |
| 7,623,357 B2 * | 11/2009 | Wallace ....................... | 361/801 |
| 7,726,987 B2 * | 6/2010 | Chen ........................... | 439/148 |
| 7,746,635 B2 * | 6/2010 | Lu ........................... | 361/679.55 |
| 7,789,691 B2 * | 9/2010 | Li et al. ....................... | 439/325 |
| 7,916,488 B2 * | 3/2011 | Chang .......................... | 361/737 |
| 2009/0280670 A1 * | 11/2009 | Feng ............................ | 439/326 |
| 2010/0033939 A1 * | 2/2010 | Liu ............................... | 361/759 |
| 2010/0259906 A1 * | 10/2010 | Chang .......................... | 361/759 |

* cited by examiner

*Primary Examiner* — Lisa Lea Edmonds  
(74) *Attorney, Agent, or Firm* — Altis Law Group, Inc.

(57) ABSTRACT

A chip card holder, for securing a chip card in an electronic device, includes a housing and a locking member, the housing defines an assembling recess for receiving a chip card, the assembling recess has a slant wall defining a through cutout; the housing defines a latching hole in line with the cutout. The locking member forms a protrusion. when a chip card is disposed in the assembling recess, the locking member passes through the cutout and presses the chip card, the protrusion of the locking member is latched into the latching hole, the chip card is secured by the locking member.

16 Claims, 5 Drawing Sheets

CHIP CARD HOLDER

BACKGROUND

1. Technical Field

The present disclosure relates to a chip card holder for a portable electronic device.

2. Description of Related Art

Portable electronic devices such as mobile phones typically employ chip cards such as SIM cards, for example for storing user information. Chip card holder is used to hold the chip cards within the portable electronic devices.

A conventional chip card holder is usually provided to facilitate convenient assembly and disassembly of a chip card. With the development of electronic industry, the chip card can be integrally manufactured with the chip card holder for decreasing the production cost. Such chip card cannot be taken out from the chip card holder.

Therefore, there is room for improvement within the art.

BRIEF DESCRIPTION OF THE DRAWING

Many aspects of the present chip card holder can be better understood with reference to the following drawings. The components in the various drawings are not necessarily drawn to scale, the emphasis instead being placed upon clearly illustrating the principles of the present chip card holder. Moreover, in the drawings, like reference numerals designate corresponding parts throughout the diagrams.

DETAILED DESCRIPTION OF THE EMBODIMENT

Figure 1:
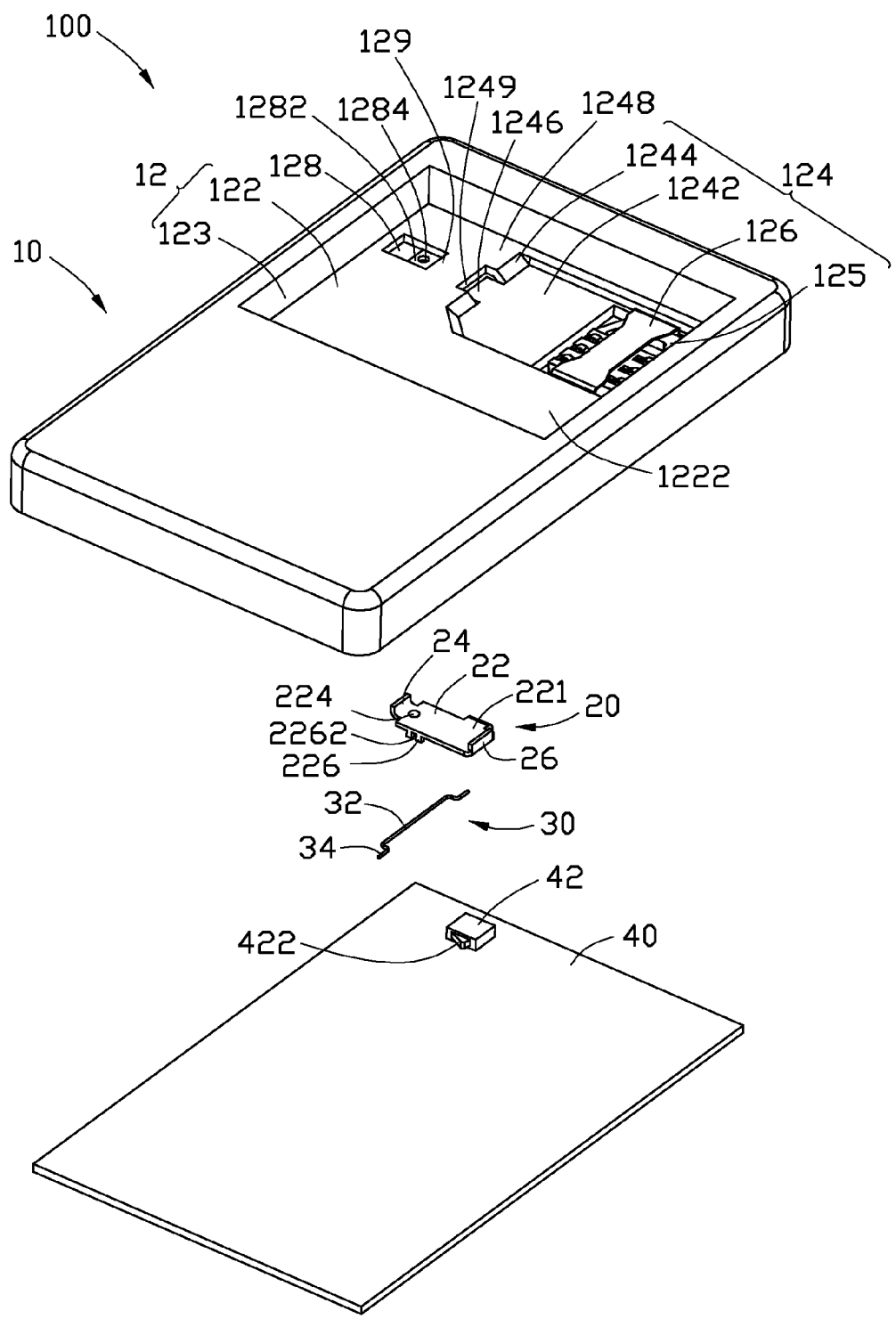
FIG. 1 is an exploded, isometric view of a chip card holder according to an exemplary embodiment.
Figure 2:
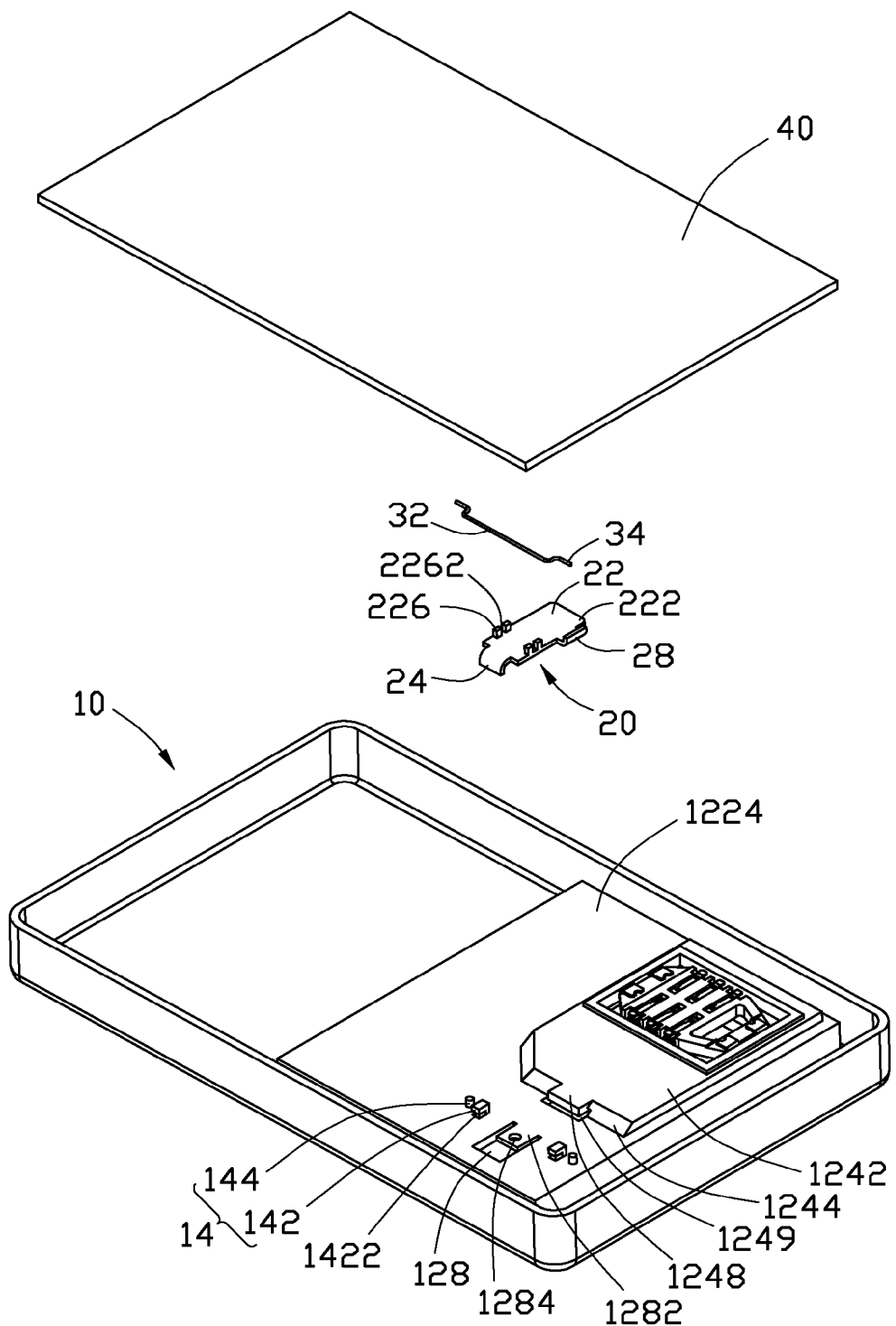
FIG. 2 is another exploded, isometric view of the chip card holder shown in FIG. 1.

Referring to FIG. 1 and FIG. 2, an exemplary chip card holder 100, which can be used in mobile phones and other portable electronic devices for holding a chip card, includes a housing 10, a locking member 20, a strip 30 and a circuit board 40.

The housing 10 includes a receiving cavity 12 for receiving a battery. The receiving cavity 12 is enclosed by a receiving wall 122 at the bottom and a peripheral wall 123 around the receiving wall 122. The receiving wall 122 has a first surface 1222 and an opposite second surface 1224. An assembling recess 124 for assembling a chip card defined in the receiving wall 122, exposed through the first surface 1222 and protruding from the second surface 1224. The assembling recess 124 includes a bottom wall 1242 and a slant wall 1244 connecting the side of the bottom wall 1242. A plurality of elastic connector terminals 125 are evenly received in the assembling recess 124 distal to the slant wall 1244. A clipping sheet 126 is secured above the elastic connector terminals 125. The slant wall 1244 has a through cutout 1246 defined therein. The bottom wall 1242 extends a protruding block 1248 aligning with the cutout 1246, accordingly, a gap 1249 is defined between the protruding block 1248 and the receiving wall 122. The receiving wall 122 defines an engaging hole 128 in line with the protruding block 1248. A separating wall 129 is formed between the engaging hole 128 and the cutout 1246. The sidewall of the engaging hole 128 adjacent to the cutout 1246 extends laterally an extending wall 1282. The extending wall 1282 is received in the engaging hole 128 and defines a through latching hole 1284 for engaging with the locking member 20.

Referring again to FIG. 2, the receiving wall 122 has two holding assemblies 14 protruding from the second surface 1224 and arranged symmetrically at two sides of the engaging hole 128. The two holding assemblies 14 are used to secure the strip 30. Each holding assembly 14 includes a holding block 142 and a holding pole 144 arranged aside. The holding block 142 defines a clipping cavity 1422 at the bottom for receiving the strip 30. The holding block 142 is located between the holding pole 144 and the engaging hole 128. The holding pole 144 is used to resist the strip 30.

Referring again to FIGS. 1 and 2, the locking member 20 includes a main board 22 having an upper surface 221 and a lower surface 222, a first folding flange 24, and a second folding flange 26, and a third folding flange 28. The first folding flange 24, and the second folding flange 26 are arranged oppositely at two ends of the main board 22. The third folding flange 28 is located at a side of the main board 22. The main board 22 has a protrusion 224 formed on the upper surface 221, adjacent to the first folding flange 24. The protrusion 224 is used to be latched into the latching hole 1284 of the housing 10. The main board 22 includes two clipping bodies 226 extending from the two opposite sides of lower surface 222. Each clipping body 226 defines a slit 2262 for receiving the strip 30. The first folding flange 24 is folded toward the upper surface 221 for engaging with the engaging hole 128. The first folding flange 24 facilitates a user's pushing of the locking member 20. The second folding flange 26 is folded toward the upper surface 221 and has the same height as the gap 1249 to be inserted into the gap 1249 for pressing the chip card received in the assembling recess 124. The third folding flange 28 is folded towards the lower surface 222 and extends laterally from the main board 22 for engaging with the slant wall 1244 and the circuit board 40.

The strip 30 can be made of a metallic material such as steel, aluminum etc. The strip 30 is elastic including a main section 32 and two folding sections 34 connecting with the two opposite ends of the main section 32.

The circuit board 40 has a stopper 42. The stopper 42 has a rib 422 laterally protruding for engaging with the third folding flange 28 of the locking member 20 when the circuit board 40 is assembled in the housing 10.

Figure 3:
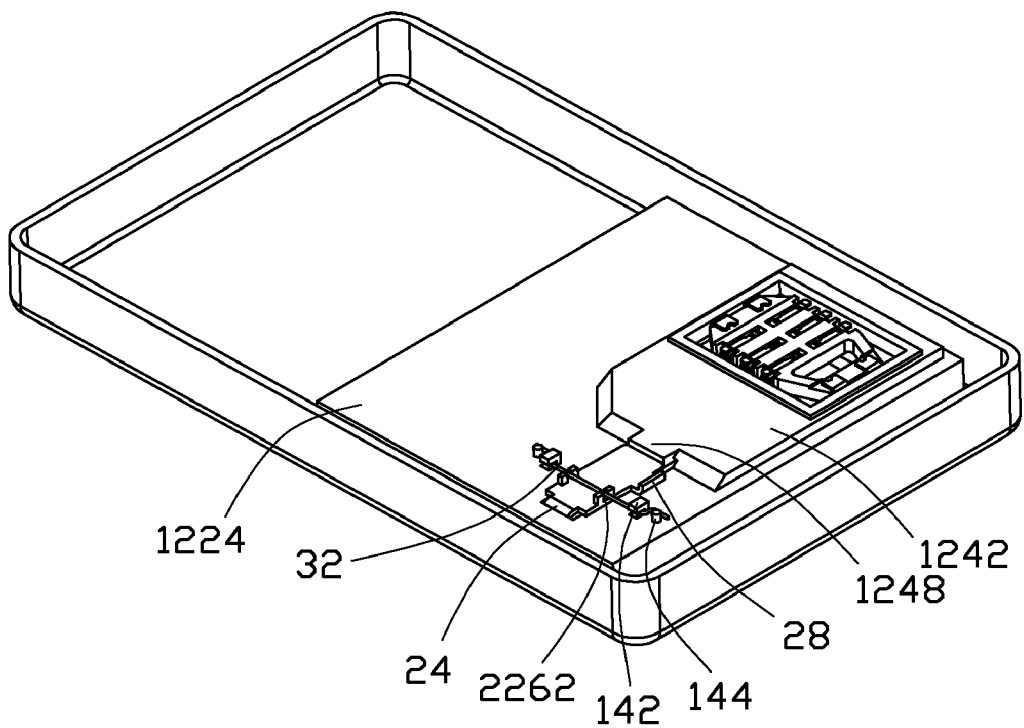
FIG. 3 is an isometric view of the chip card holder in assembling shown in FIG. 1.
Figure 4:
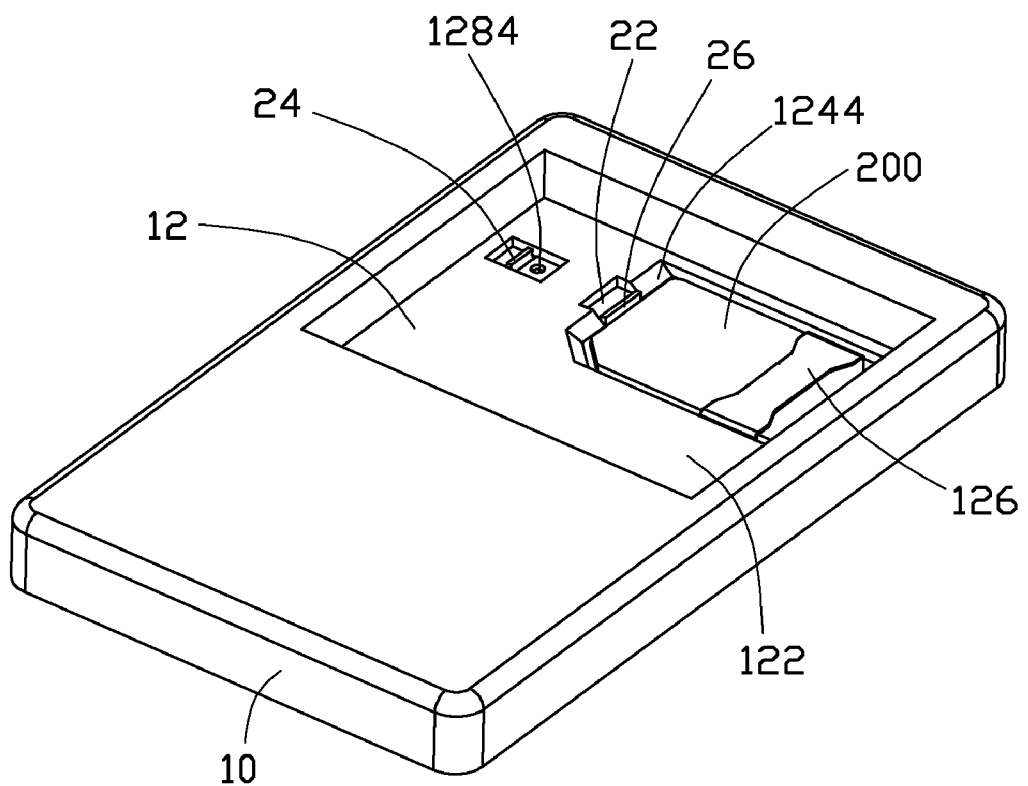
FIG. 4 is an isometric view of the chip card holder shown in FIG. 3 from another angle.

Referring to FIG. 3 and FIG. 4, to assemble the chip card holder 100, the locking member 20 is assembled in the housing 10. The first folding flange 24 of the locking member 20 is inserted into the engaging hole 128, and the main board 22 abuts the separating wall 129. The second folding flange 26 passes through the gap 1249 and enters into the assembling recess 124. At this time, the slits 2224 of the main board 22, the holding block 142 and the holding pole 144 are substantially aligned in a line. By latching the strip 30 to the locking member 20, each folding section 34 of the strip 30 is latched with each corresponding holding assembly 14, and the tail end of the folding section 34 resists against the holding pole 144. The main section 32 is clipped into the clipping cavity 1422 of the holding block 142, passing through the slits 2224 of the main board 22. The chip card holder 100 is thus assembled.

Figure 5:
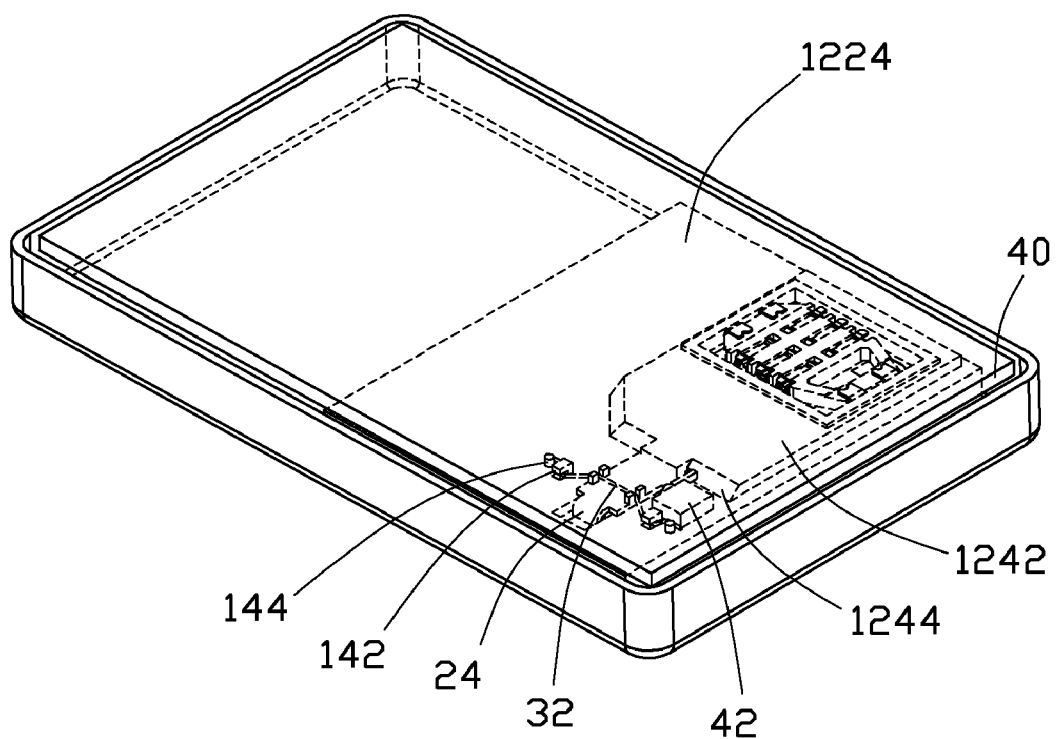
FIG. 5 is an isometric view of the chip card holder shown in FIG. 3 after assembling a chip card.

Referring to FIG. 4 again, to hold a chip card 200 by the chip card holder 100, the chip card 200 is inserted into the assembling recess 124. At this stage, an end of the chip card 200 is inserted and clipped into a space between the clipping sheet 126 and the elastic connector terminals 125. The other end of the chip card 200 abuts the edge of the cutout 1246 of the assembling recess 124. Referring to FIG. 5, the locking member 20 is pushed to move toward the assembling recess 124 until the third folding flange 28 resists against the slant wall 1244 of the assembling recess 124. The main section 34 of strip 30 moves along with the locking member 20 to be elastically distorted. At this time, the protrusion 224 of the main board 22 is latched into the latching hole 1284 of the housing 10, and thus the locking member 20 is securely locked. The end of the chip card 200 distal to the clipping sheet 126 is securely held by the second folding flange 26. Thus, the chip card 200 is secured in the assembling recess 124. The circuit board 40 is mounted to the housing 10. The stopper 42 abuts the second surface 1224 of the receiving wall 122, and the rib 422 of the stopper 42 resists the end of the third folding flange 28.

It is understood that the holding assembly 14 can have other structures, such as the holding poles 164 can be omitted, accordingly only one of the holding blocks 162 defines a through hole to receiving the end of the strip 30.

It is understood that the engaging hole 128 can be omitted, and the housing 10 defines a latching hole 1264 to engage with the protrusion 224. Accordingly, the first folding flange 24 is omitted.

It is understood that the strip 30 can be omitted, the locking member 20 can be latched with the housing 10 by an engagement of the protrusion 224 of the locking member 20 with the latching hole 1284 of the housing 10.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A chip card holder, for securing a chip card in an electronic device, comprising:
   a housing defining an assembling recess for receiving a chip card, the assembling recess having a slant wall defining a cutout through thereof; the housing also defining a latching hole in line with the cutout;
   a locking member forming a protrusion therein,
   wherein when a chip card is placed in the assembling recess, the locking member passes through the cutout and presses the chip card, the protrusion of the locking member latches into the latching hole, the chip card is secured in the assembling recess by the locking member.

2. The chip card holder as claimed in claim 1, wherein the housing forms a receiving cavity having a receiving wall, the assembling recess is defined in the receiving wall.

3. The chip card holder as claimed in claim 2, wherein a plurality of elastic connector terminals are evenly received in the assembling recess distal to the slant wall, a clipping sheet is secured above the elastic connector terminals and forms a space with the elastics connector terminals to clip an end of a chip card.

4. The chip card holder as claimed in claim 3, wherein assembling recess includes a bottom wall, the slant wall is formed aside of the bottom wall distal to the clipping sheet, the bottom wall extends a protruding block aligning with the cutout, a gap is formed between the protruding block and the bottom wall for guiding and clipping an end of the locking member.

5. The chip card holder as claimed in claim 4, wherein the receiving wall defines an engaging hole in line with the protruding block, a sidewall of the engaging hole extends an extending wall where the latching hole defined in.

6. The chip card holder as claimed in claim 5, wherein a locking member includes a main board and a first folding flange at an end of the main board, the first folding flange has the same height with the gap and can pass through the gap and enter into the assembling recess.

7. The chip card holder as claimed in claim 6, wherein the protrusion is formed on the main board and adjacent to the first folding flange.

8. The chip card holder as claimed in claim 6, wherein the main board forms two clipping bodies, each the clipping body defines a slit, the receiving wall forms two holding assemblies arranged at two sides of the engaging hole, the chip card holder also includes a strip, the two ends of the strip are secured by the holding assemblies and the strip is clipped in the slit.

9. The chip card holder as claimed in claim 6, wherein main board forms a third folding flange at the side thereof, the folding flange is used for engaging with the slant wall.

10. The chip card holder as claimed in claim 9, wherein the chip card holder also includes a circuit board, the circuit board forms a stopper therein, the stopper has a rib in a sidewall thereof, the rib engages with the third folding flange.

11. The chip card holder as claimed in claim 8, wherein the holding assembly includes a holding block and a holding pole aside the holding blocking, the holding block defines a clipping cavity to clip the strip.

12. A chip card holder, for securing a chip card in an electronic device, comprising:
   a housing defining an assembling recess for receiving a chip card, the assembling recess having a slant wall, the slant wall defining a cutout through thereof; the housing also forms holding assemblies therein;
   a locking member, and
   a strip;
   wherein when a chip card is placed in the assembling recess, the locking member passes through the cutout and presses the other end of the chip card, the locking member is secured by locking the strip with the holding assemblies.

13. The chip card holder as claimed in claim 12, wherein the housing forms a receiving cavity having a receiving wall, the assembling recess is defined in the receiving wall.

14. The chip card holder as claimed in claim 13, wherein assembling recess includes a bottom wall, the slant wall is formed aside of the bottom wall distal to the clipping sheet, the bottom wall extends a protruding block aligning with the cutout, a gap is formed between the protruding block and the bottom wall for guiding and clipping an end of the locking member.

15. The chip card holder as claimed in claim 14, wherein a locking member includes a main board and a first folding flange at an end of the main board, the first folding flange can pass through the gap and enter into the assembling recess.

16. The chip card holder as claimed in claim 15, wherein the main board forms two clipping bodies, each the clipping body defines a slit, the receiving wall forms two holding assemblies, the two ends of the strip are secured by the holding assemblies and the strip is clipped in the slit.

* * * * *